Oct. 7, 1952  J. W. RICHARDS ET AL  2,612,904
DRAIN VALVE
Filed Feb. 10, 1950
Fig. 1
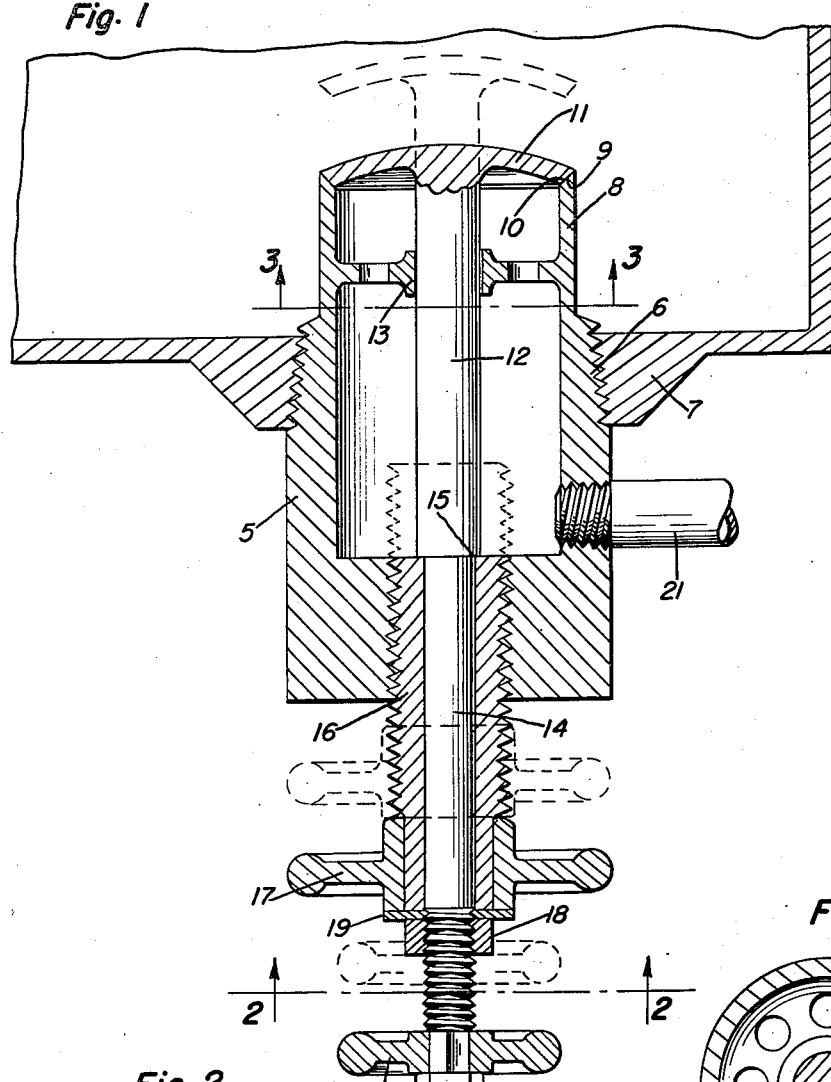
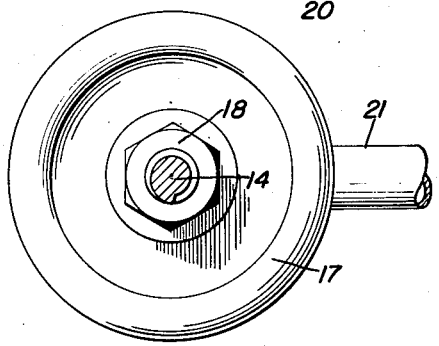
Fig. 2
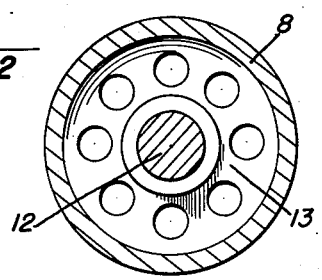
Fig. 3
John W. Richards
Barnie G. Harris
INVENTORS
BY Clarence A. O'Brien
and Harvey B. Jacobson
Attorneys Patented Oct. 7, 1952

2,612,904

UNITED STATES PATENT OFFICE 2,612,904

DRAIN VALVE

John W. Richards and Barnie G. Harris, Pampa, Tex.

Application February 10, 1950, Serial No. 143,508

1 Claim. (Cl. 137—333)

The present invention relates to new and useful improvements in drain valves for tanks and the like, and more particularly to a non-freezing drain valve.

An important object of the invention is to provide a drain valve including a valve body or cage attached to a tank and in which the valve is positioned internally of the tank in the liquid therein to prevent freezing of the valve and providing valve opening and closing means externally of the valve body or cage.

A further object of the invention is to provide screw feed means for opening and closing the valve and in which the valve stem is positioned for independent rotation to permit turning of the valve on its seat or re-seating the valve while the valve is held in its closed position.

A still further object is to provide a device of this character of simple and practical construction, which is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a vertical sectional view of the valve; and

Figures 2 and 3 are transverse sectional views taken substantially on the lines 2—2 and 3—3 of Figure 1.

Referring now to the drawing in detail, wherein, for the purpose of illustration, we have disclosed a preferred embodiment of the invention, the numeral 5 designates the valve body or cage having an externally threaded portion 6 between its inner and outer ends for threading into the bottom of a tank 7.

The upper or inner end of valve body 5 is tubular in construction, as shown at 8, and formed with a valve seat 9 at its upper end on which the beveled edge 11 of a concavo-convex valve 11 is seated.

Valve 11 is formed with a valve stem 12 extending downwardly through the lower end of body 5 and is slidably supported in a spider 13 in the tubular upper end 8 of the valve body which forms a guide for the valve stem.

Valve stem 12 is of reduced diameter at its lower end as shown at 14 to form a shoulder 15 held against the inner end of an externally threaded sleeve or screw 16 through which the reduced lower end 14 of the valve stem passes and is rotatably carried. Sleeve or screw 16 is threaded in the lower or outer end of valve body 5 and a hand wheel 17 is suitably secured to the outer end of sleeve or screw 16 to feed the sleeve or screw inwardly and outwardly of the lower end of the body by the turning of the wheel.

Valve stem 12 is secured to sleeve or screw 16 for movement therewith by means of a nut 18 threaded on the lower or outer end of the valve stem and which bears against a washer 19 positioned between the nut and the hand wheel 17. Tightening of nut 18 draws the shoulder 15 against the inner end of sleeve or screw 16.

A second hand wheel 20 is secured to the outer or lower end of valve stem 12 and by means of which the valve stem and valve 11 may be rotated independently of the sleeve or screw 16 by loosening nut 18.

A drain pipe 21 is attached to valve body 5 at the lowermost point of the interior thereof to keep the valve body free from accumulation of liquid therein and by means of which the contents of the tank 7 is drained when the valve 11 is opened.

In the operation of the device, when it is desired to drain tank 7, hand wheel 17 is turned in a direction to feed sleeve or screw 16 upwardly or inwardly in valve body 5 to thus open valve 11 and the valve is closed by a reverse movement of the hand wheel 17.

The valve 11 may be turned to re-seat itself on valve seat 9 by loosening nut 18 and turning hand wheel 20, which thus rotates valve stem 12 while sleeve or screw 16 remains stationary.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

A drain valve comprising a valve body having an externally threaded portion intermediate its ends adapted for attaching to a tank with its inner end projecting into the tank, said valve body having a drain port in its outer end, a sleeve coaxial with the body and threaded in the outer end of the body, a valve stem axially movably disposed in the sleeve and projecting into said body farther than said sleeve, means operable from outside of said valve body for releasably locking the stem to the sleeve for uniform rotary and longitudinal movement therewith, a spider fixed to said body and located near the inner end of said body, said spider having an opening through which said stem passes to guide said stem and to serve as a means for aiding in preventing said stem from flexing, a valve seat at the inner end of said body, a valve head on the inner end of the stem and adapted to engage the seat, and independently manually operable means on the outer end of the sleeve and on the outer end of the stem for selectively turning the sleeve and stem.

JOHN W. RICHARDS.
BARNIE G. HARRIS.

REFERENCES CITED

The following references are of record in the file of this patent:

UNITED STATES PATENTS

| Number | Name | Date |
|---|---|---|
| 595,123 | Johnson | Dec. 7, 1897 |
| 1,069,929 | Donavan | Aug. 12, 1913 |
| 1,191,046 | Wagner | July 11, 1916 |
| 1,591,859 | McCue | July 6, 1926 |
| 1,627,606 | Hutchings | May 10, 1927 |
| 1,782,702 | Wheeler | Nov. 25, 1930 |